United States Patent [19]

Irwin

[11] 3,947,355

[45] Mar. 30, 1976

[54] APPARATUS AND PROCESS OF SEPARATING PACKING HOUSE WASTE

[76] Inventor: David C. Irwin, 2900 N. Grand, Amarillo, Tex. 79107

[22] Filed: Dec. 26, 1974

[21] Appl. No.: 536,459

Related U.S. Application Data

[63] Continuation of Ser. No. 394,793, Sept. 6, 1973, abandoned.

[52] U.S. Cl. .................. 210/83; 210/528; 210/534; 210/540; 260/412.5; 260/428; 426/417
[51] Int. Cl.² .......................................... B01D 21/26
[58] Field of Search ......... 210/65, 69, 83, 179, 523, 210/525, 528, 530, 531, 534, 540; 260/412.5, 412.6, 428; 426/417

[56] References Cited
UNITED STATES PATENTS

| | | | |
|---|---|---|---|
| 2,635,104 | 4/1953 | Chayen | 210/69 X |
| 2,876,863 | 3/1959 | Kivari | 210/525 X |
| 3,465,887 | 9/1969 | Cookney | 210/525 |
| 3,770,132 | 11/1973 | Quast et al. | 210/525 |

Primary Examiner—Charles N. Hart
Assistant Examiner—Robert G. Mukai
Attorney, Agent, or Firm—Ely Silverman

[57] ABSTRACT

Scraper elements are resiliently and movably supported to alternately, at one stage in the process, pass along a sloped ramp in contact with a container wall to remove surface layers of tallow-like material from water contaminated therewith and, in a subsequent stage of the process, to be continually and automatically cleansed.

6 Claims, 6 Drawing Figures

APPARATUS AND PROCESS OF SEPARATING PACKING HOUSE WASTE

This is a continuation of application Ser. No. 394,793, filed Sept. 6, 1973, and now abandoned.

BACKGROUND OF THE INVENTION

1. The Field of the Invention

The field of art to which this invention pertains are gravitational receptacles with horizontally rotating scrapers and a trap for lighter constituents and liquid purification by gravitational forces.

2. Description of the Prior Art

The prior art has regarded as waste material the product of packing house cleansing operations and provided large volumes of contaminated water: by the apparatus and process of this invention, such waste products are separated into useful components and recovered automatically and reliably and, also, waste water is upgraded for useful purposes.

SUMMARY OF THE INVENTION

A vertically elongated tank is used as a container for separating light semi-liquid components from large volumes of water contaminated therewith and provided at varied input rates to such container. Such volumes of such water are passed into such container at a substantial distance below the zone whereat such components are initially separated so as to create a deep quiescent zone for such initial separation and a sloped and vertically elongated ramp is used to insulate the mass of initially separating material from the translating and agitating action of a series of scrapers. The scrapers are arranged to act only on the upper surface portions of the mass in the container to very limited depths, while each scraper is also so supported as to provide, at its bottom edge, an upwardly, forwardly and centrally directed straight skewed or oblique line of contact with the sloped ramp upper surface while forming a line of contact with the wall of the container adjacent the ramp at the side edge of the scraper whereby to repeatedly create V-shaped pockets with cleanable straight line edges. The pockets so formed serve to continually raise portions of the surface layers of the oily, semi-liquid tallow material on the ramp and so separate that oily component from the liquid mixture initially containing such component. Such action is effective because the scraping elements are continually automatically cleansed of usually adherent gum-like oily material contaminating the water by continual passage of such scraper into engagement with cleansing elements located in the path of the linear edges scrapers during the above-described separating operation.

DESCRIPTION OF THE PREFERRED EMBODIMENT

Figure 1:
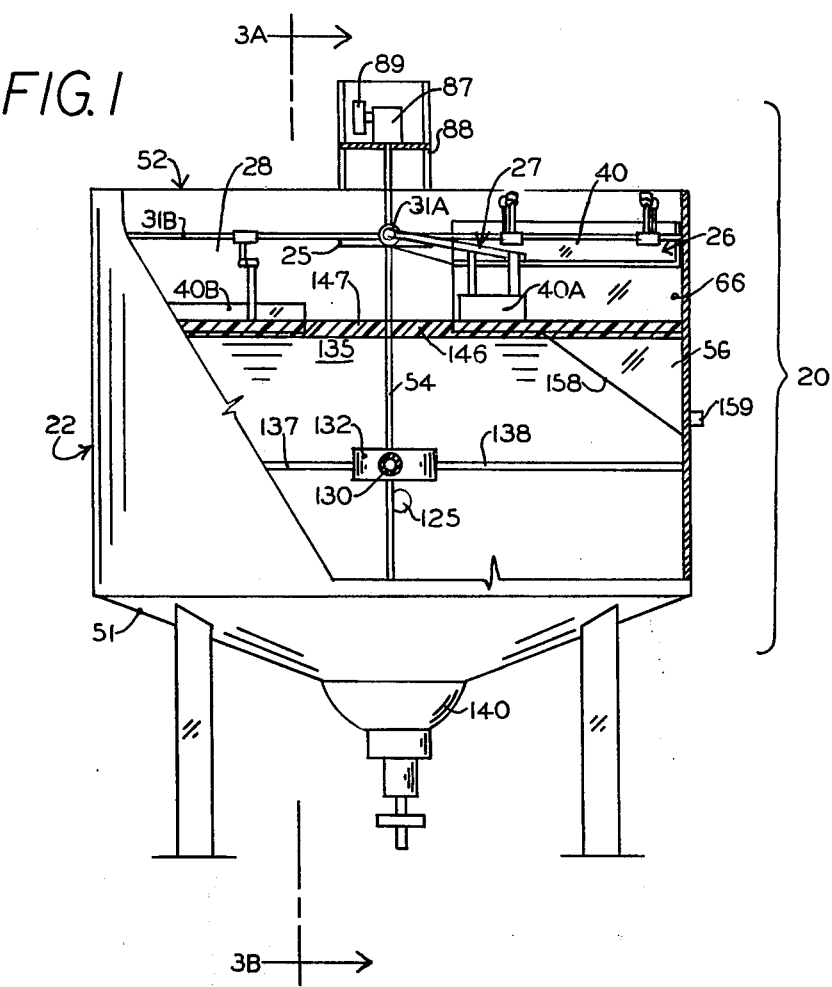
FIG. 1 is a side view of an apparatus according to this invention, broken away to show, diagrammatically, the interior thereof.

The apparatus 20 comprises, in cooperative combination, a tank 22, a blade carrier assembly 24 and a motor and drive assembly 23. Assembly 23 is located on top of the tank 22 and is operatively connected to the blade carrying assembly 24 on tank 22.

The motor and drive assembly 23 comprises a motor 86 and a gearbox 87, both firmly mounted on rigid platform 88. The platform is a rectangular plate firmly attached to the top of the tank 22. The motor (a one horsepower electric motor in the particular embodiment) has a standard output pulley that drives the standard input pulley to the gearbox by a conventional belt 89. The gearbox drives the carrier blade assembly central shaft 54 at about 1 r.p.m., as gearbox 87 is a 2500-1 speed reducer.

The tank 22 is a rigid cylindrical container with a rigid, water-tight vertically extending cylindrical wall 50 and a bottom wall 51. The top 52 is open.

A chamber 60 within the tank 22 is separated by partition plates 55 and 56 into a grease box chamber 80 and a separator chamber 81. The entry partition plate 55 and discharge partition plate 56 extend vertically and radially and define the front and rear of a grease box discharge compartment 80 of generally prismatic shape located within the total chamber 60. The chamber 80 is thus separated from the separator chamber 81 by plates 55 and 56 and other parts of the chamber 80. One, lower front, corner of the grease box chamber 80 is adjacent to the tank wall 50. Another, upper central corner 84, is adjacent the shaft 54 of blade carrier assembly 24, although not in contact therewith. Another, front upper corner 74 of chamber 80, is at the junction of the top of partition plate 55 and wall 50; another, rear upper corner 75, is at the junction of the top of partition plate 56 and the tank wall 50.

A horizontal partition grate 57 is composed of a plurality of horizontal partition grate slats as 58A, 58B, and 58C–F. These slats are separated from each other by corresponding slat spaces 59A, 59B and 59C. The grate is located at the top of grease box chamber or discharge compartment 80 and the slats thereof are firmly connected to the top edges of plates 55 and 56.

The partition plates 55 and 56 do not extend to the top of the tank 22 but are located about 12 inches therebelow and are horizontal and straight. The slats, as 58A–F, extend perpendicularly to a radius of the tank 22, which radius is located halfway between the top edge of the junction of plate 55 and wall 50 and the top edge of the junction of plate 56 and wall 50.

An inlet pipe 130 enters the wall 50 perpendicularly thereto and extends to and connects to the interior of a cylindrical water-breaker casing 132. Casing 132 comprises a vertical right cylindrical side wall 133, co-axial with shaft 54 and tank wall 50, and an upper horizontal casing plate 134. A central hole 136 provides for passage of shaft 54 through plate 134. Casing 132 is downwardly open. Wall 133 is attached by horizontal radially extending rigid spider arms 137, 138 and 139 to the interior of wall 50 of the tank 22. In a 12 foot high tank, the inlet pipe 130 is a 2½ inch line and enters tank 22 5 feet below the top edge of the tank wall 50.

The grease box chamber 80 is prismatic or pie-shaped. It is defined by the vertical plates 55 and 56 which meet at a central edge 157 with water-tight connection therebetween. A triangular grease box bottom floor plate 158 slopes radially downward to a point slightly below grease box outlet 159 and there attaches to tank wall 50. Plate 158 is firmly joined to bottom of plates 55 and 56 and wall 50 in a water-tight manner. Plates 55, 56 and 158 and the portion of tank wall 50, accordingly, form a watertight compartment separate from chamber 81 and open at grease chamber top opening 160. Opening 160 is covered, in part, by grate 57. Chamber 81 is open at its bottom to discharge outlet 159. Plate 158 is preferably V-shaped in transverse vertical section to facilitate liquid discharge therefrom.

In tank 22 of 12 foot vertical wall length, discharge outlet 159 is 5 feet from top edge of tank wall 50.

An outlet siphon assembly 120 comprises an outlet siphon inlet arm 122, which is a pipe, located outward of and adjacent to tank wall 50 and extends vertically parallel to the central longitudinal axis of the vertical right cylindrical wall 50 of the tank 22, an outlet siphon discharge arm 123 parallel to outlet siphon inlet arm 122, a level control box 124, an outlet siphon inlet orifice 125 and a vent 126. The outlet siphon inlet orifice 125 is in wall 50 of tank 22 and is, in a 12 foot high tank 22, 6 feet from the top edge of the tank wall 50. The bottom of box 124 is connected to outlet siphon arms 122 and 123 and is located at the intended vertical level of the top of the liquid in chamber 81 of tank 22. A vent 126 prevents emptying of tank below the level of 9 to 12 inches below top edge of plate 65.

A sump chamber 140 is located at and connected to the bottom of the conical tank bottom wall 51. Sump chamber 140 is semi-spherical in shape and is open to a hole 162 at center and bottom of wall 51. Chamber 140 has an orifice 141 at its bottom which orifice is operatively connected to a cleanout drain 143 through a gate valve 142. Orifice 141 provides for discharge of liquid and solids from the interior of tank chamber 60 through a butterfly valve 144 to tank discharge line 145.

A feed inlet line 130 is provided with an inverted U-shaped inlet siphon pipe 170 reaching to an upper level 172 which is at the intended upper level of the liquid in the interior of the tank chamber 81 and is provided with a vent pipe 173 extending thereabove to break any reverse siphon action when the pump 171 driving liquid into the tank chamber 60 ceases to pump fluid into the tank 22.

Figure 6:
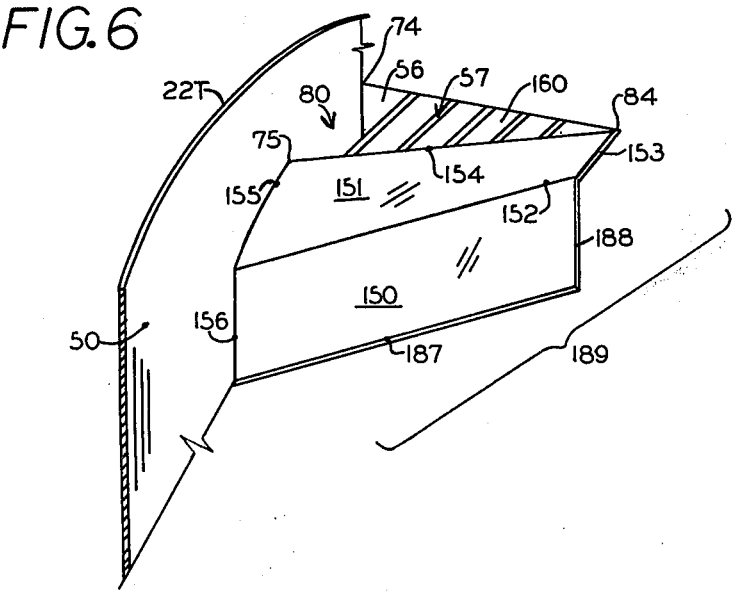
FIG. 6 shows another entry ramp for use in the apparatus 20 of this invention.
Figure 5:
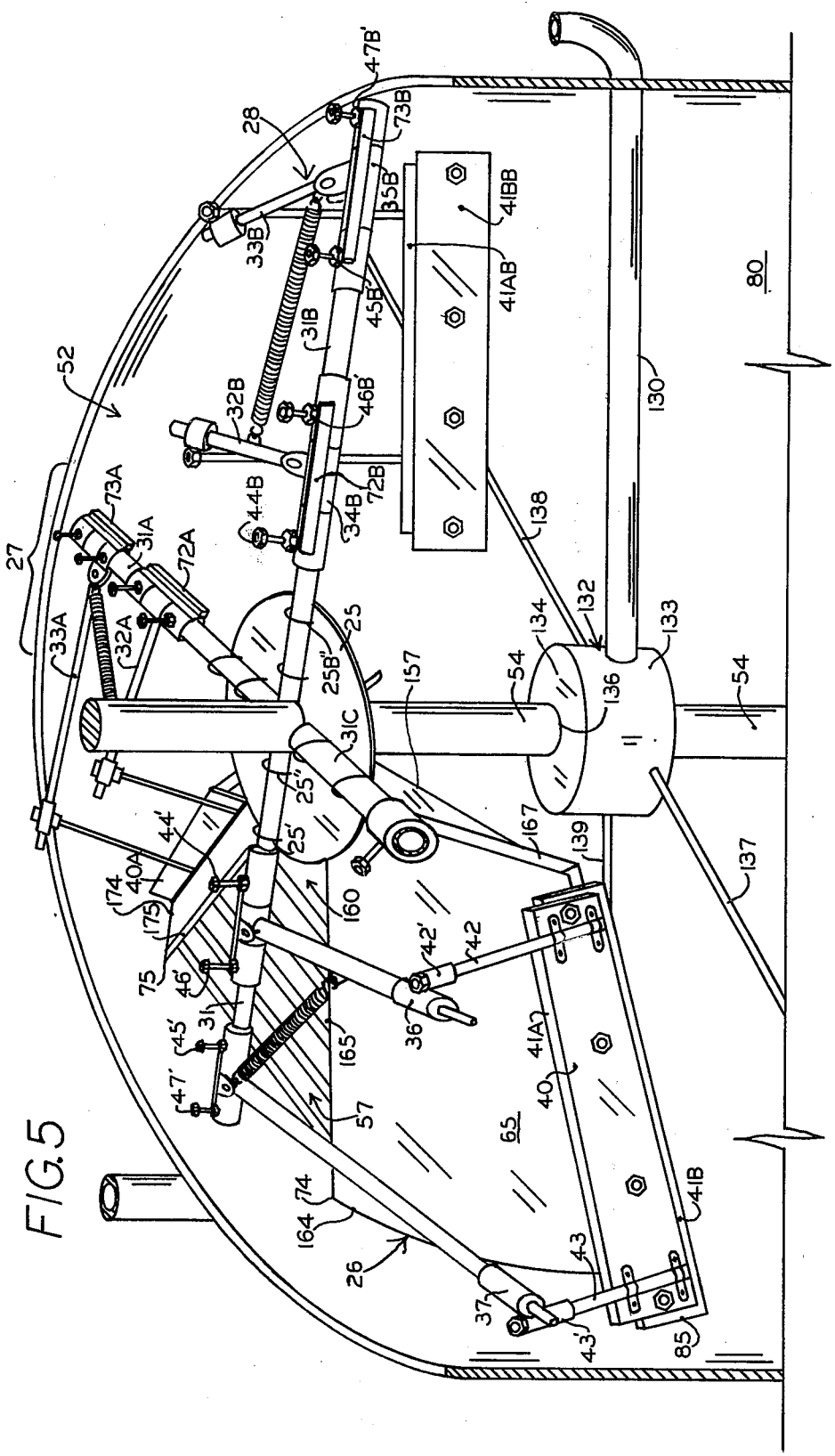
FIG. 5 is a perspective side view along the direction of the arrow 5A-5B of FIG. 4 in another position of parts of apparatus 20 to show the positions of the blades 40 and related parts in such position of the apparatus, also shown as a pictorial view.

The blade carrier assembly 24 comprises a rigid circular blade carrier plate 25 (24 inches in diameter) supported on the shaft 54 and firmly attached thereto. A series of like blade carrier subassemblies 26, 27, 28 and 29 are firmly attached to plate 25, as by clamps 25' and 25''. The subassemblies 26, 27, 28 and 29 are all alike; details of one of them, subassembly 26, are given in detail as exemplary of them all. Corresponding parts on subassembly 27 are denominated by the same reference as for subassembly 26 but with additional referent letter A; parts on subassembly 28 are given the same referent numbers for like parts in subassembly 26 with additional referent letter B while the parts of subassembly 29 corresponding to the parts of subassembly 26 are given the same referent numerals as like parts in subassembly 26 with the additional referent letter C. Thus, the blades 40 of subassembly 26, blade 40A of subassembly 27, blade 40B of subassembly 28 and blade 40C of subassembly 29 are identical in shape, size and function during the entire cycle of their operation, although at any one given instant, as shown in FIG. 5, when those different subassemblies are in different successive positions of their cycles of operation as are herein described, the functions of such structures and positions of their parts are different. FIGS. 5 and 6 are pictorial rather than schematic.

Each carrier plate as subassembly 26 comprises rigid cylindrical shaft 31 (49 inches long and 2 inches o.d.) on which are located a central blade carrier arm 32 (21 inches long) and a lateral blade carrier arm 33 (36 inches long). The central blade carrier arm 32 is pivotally attached 16 inches from shaft 54 to a front central clevis 101, which clevis is fixedly attached to a cylindrical sleeve 34. Sleeve 34 is a rigid cylindrical sleeve which slidably embraces the cylindrical shaft 31. The lateral blade carrier arm 33 is pivotally attached 45 inches from shaft 54 to a lateral clevis 102, having rigid upper and lower plate which clevis is firmly and fixedly attached to a front lateral sleeve 35, which sleeve is identical in structure to sleeve 34 and is likewise pivotally attached to shaft 31. Thereby, the arms 32 and 33 may each separately pivot about the axis of the shaft 31. A pivot pin as 38 in each clevis as 101 of each sleeve as 34 pivotally connects the arm as 32 (and 33) with the front arm sleeve therefor as 34 (and 35).

A rear central sleeve 36 is pivotally attached to the rear end of central arm 32 while a rear lateral sleeve 37 is attached to the rear end of the lateral blade carrier arm 33. The arm 33 is attached by pivot pin 39 to the front lateral clevis of sleeve 35 so that such arm 33 may pivot about the axis of that pin while the sleeve 35 may pivot about the carrier arm shaft 31.

A wiper blade 40 comprises a rigid metal support frame 41A (6 inches high, ½ inch thick and 42 inches wide steel) and a flexible wiper blade 41B (6 inches high, ½ inch thick and 42 inches wide) and with its bottom edge extending (1½ inches) below bottom edge of frame 41A, is firmly attached to and supported at its central end by a rigid cylindrical bracket rod 42. Bracket rod 42 is pivotally supported in a cylindrical sleeve 42' which is firmly attached to a rigid cylindrical sleeve 36 which is pivotally attached to the rear end of the central blade carrier arm 32 while a lateral bracket 43 is similarly pivotally attached to the rear end of the lateral blade carrier arm 33 by a sleeve 43' which is firmly attached to a rigid cylindrical sleeve 37 which is pivotally attached to the rear end of blade carrier arm 33.

The sleeve 34 is pivotally located on the shaft 31 but is limited and prevented from any longitudinal movement along the shaft 31 by an inner central collar 44 and a lateral inner collar 46, while, correspondingly, the lateral sleeve 35 is located at a fixed distance along the shaft 31 by a central outer collar 45 and a lateral outer collar 47. Each sleeve as 34 and 35 has firmly and fixedly attached thereto a cross bar 72 and 73, respectively, extending parallel to shaft 31 — in cooperation with collar (as 44 and 46) adjacent each sleeve (34) — to limit the rotation of sleeves 34 and 35, and, hence, arms 32 and 33, with respect to the shaft as 31. Each shaft as 31 is firmly and rigidly fixed to plate 25 and, accordingly, does not rotate relative thereto. Each collar, as 44, 46, 45 and 47, has a nut, as 44', 46', 45' and 47', firmly welded thereto.

An inner set screw 48 is located in the nut as 44' in each central inner collar 44 and an outer set screw is located in the nut as 46' for each lateral inner collar 46 to fix the angle at which a bracket or clevis as 101 and 102 may rotate with respect to the shaft 31 by engagement of such nuts as 44' and 46' with the cross bar, as 72 on sleeve 34 (or 73 for sleeve 35), after firm fixing of the position of such nuts on the cross bar by the set screw (as 48) for each such collar (as 44). Such fixing of the collar, accordingly, limits the rotation of arms as 32B and 33B of subassembly 28 in counterclockwise direction, as shown in FIG. 5. Thereby, the maximum downwardly extended position of the blades as 40 in subassembly 26 (and 40A, 40B and 40C for subassemblies 27, 28 and 29) is determined, as shown for subassemblies 26 and 28, although the blades 40, 40A, 40B and 40C are free to rise, as shown for subassembly 27 in FIG. 5.

A spring 61 under tension extends from a lateral eye 63 firmly fixed to the lateral sleeve 35 to an eye 62 on the central blade carrier arm 32, eye 62 being substantially halfway between the points of attachment of arm 32 to the rear bracket sleeve 36 and to the front sleeve 34. Thereby, the spring 61 serves to urge the arm 32 to move laterally at its rear end. Because of the firm attachment of the blade 40 to the rear end of the arm 32, the rear end of the arm 32 is also moved laterally by the spring 61. This action maintains the lateral edge 85 of each blade as 40 to resiliently yet firmly contact the inner wall 50 of the tank 22.

Figure 2:
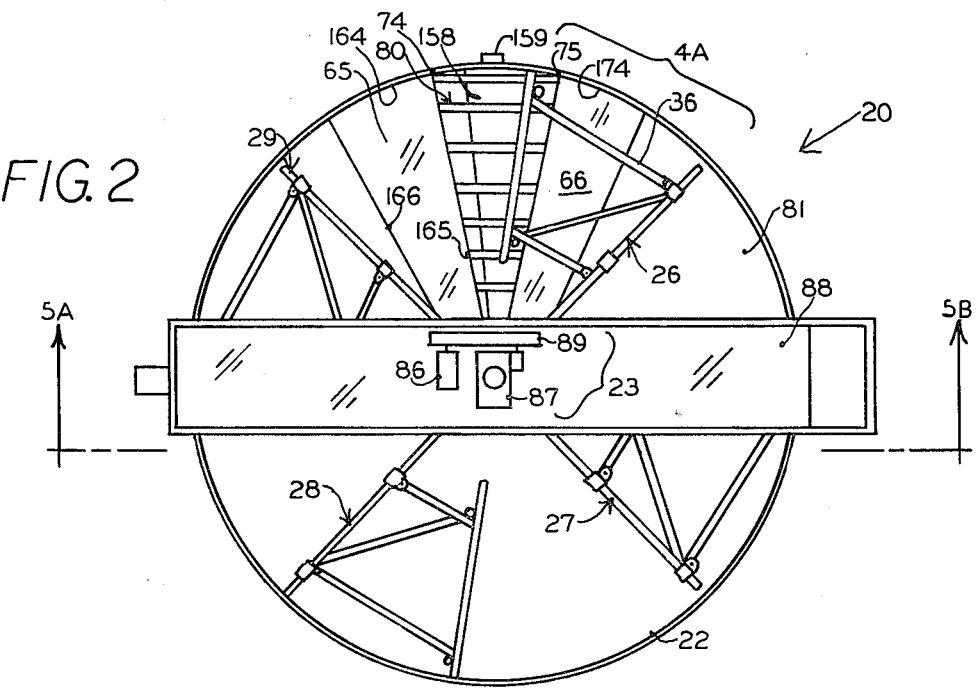
FIG. 2 is a top diagrammatic view of the structure of FIG. 1.
Figure 4:
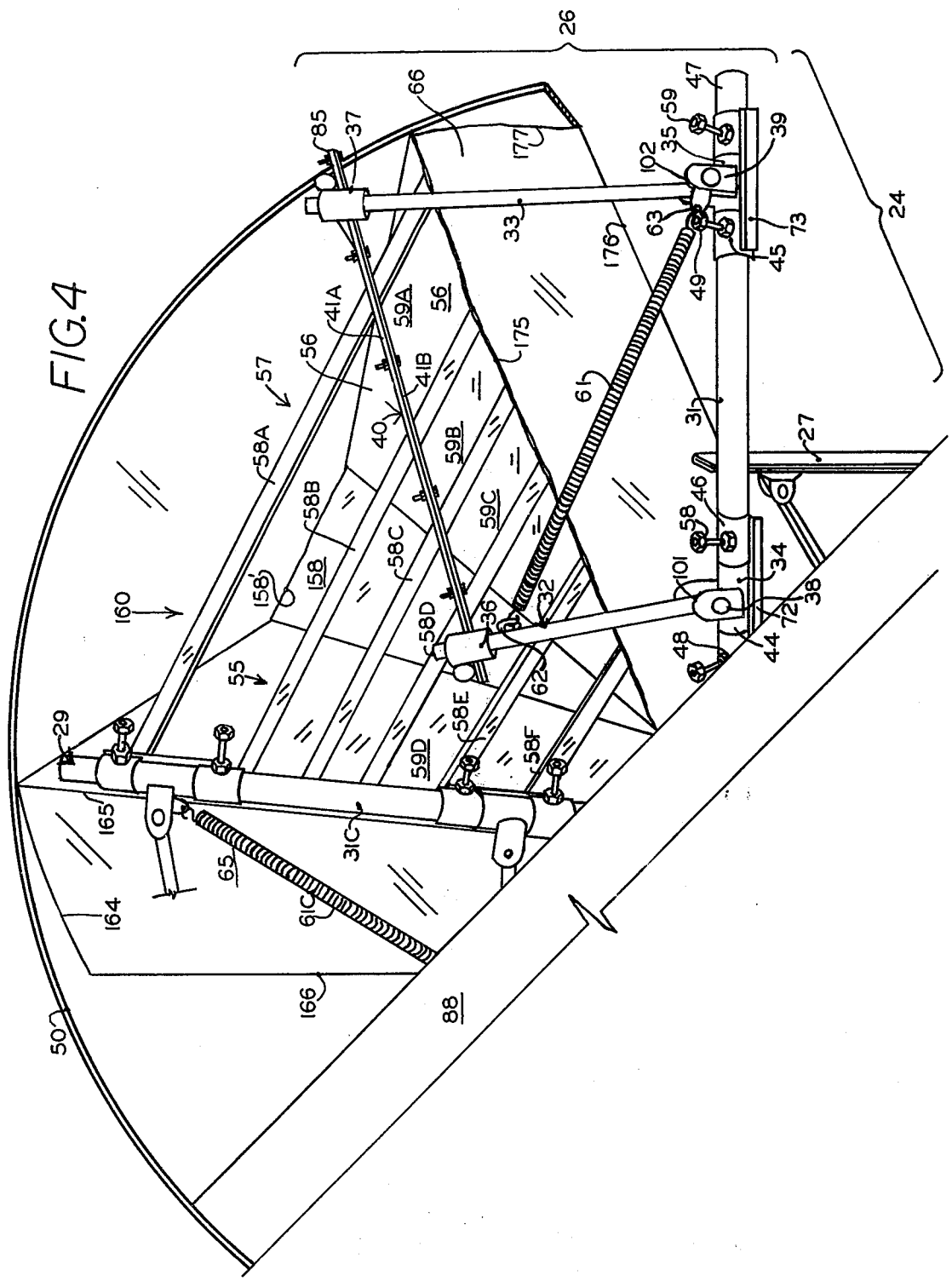
FIG. 4 is an enlarged top view of zone 4A of FIG. 2 in one position of parts thereof to show details of the relationship of those parts in that zone: this is a pictorial view of an operating apparatus according to the invention.

A smooth surfaced flat rigid entry ramp plate 65 is sloped upwards and clockwise (clockwise as shown in FIGS. 2, 4 and 5) and is firmly attached at its rear or clockwise edge 165 to the straight horizontal top edge of entry partition plate or wall 55 and is firmly attached with a water-tight fit at its lateral or radial edge to the curved inner wall 50 of tank 22. Entry ramp plate 65 is curved at its lateral edge 164, straight at its rear edge 165 and front edge 166 and straight at its central edge 167. The rear edge 165 is 46 inches long and located 12 inches below the top edge 22T of tank 22 (as is top edge of partition entry plate wall 55). The front edge 166 is 46 inches long and, at its junction with lateral edge 164, 36 inches below top edge of tank wall 50. The lateral edge 164 is 36 inches long. Edge 167 is straight and 34 inches long and, at its closest point thereto, located 5 inches from shaft 54 and a smooth surfaced flat rigid discharge ramp plate 66 is sloped downwards and clockwise (clockwise as shown in FIGS. 2, 4 and 5) and is firmly attached at its front or counterclockwise edge 175 to the straight horizontal top edge of discharge partition plate or wall 56 and is firmly attached with a water-tight fit at its lateral or radial edge to the curved inner wall 50 of tank 22. Discharge ramp plate 66 is curved at its lateral edge 174, straight at its front edge 175 and discharge edge 176 and straight at its central edge 177. The front edge 175 is 46 inches long and located 12 inches below the top edge of tank 22 (as in top edge of partition discharge plate wall 56). The rear edge 176 is 46 inches long and, at its junction with 36 inch long lateral edge 174, 36 inches below top edge of tank wall 50.

Figure 3:
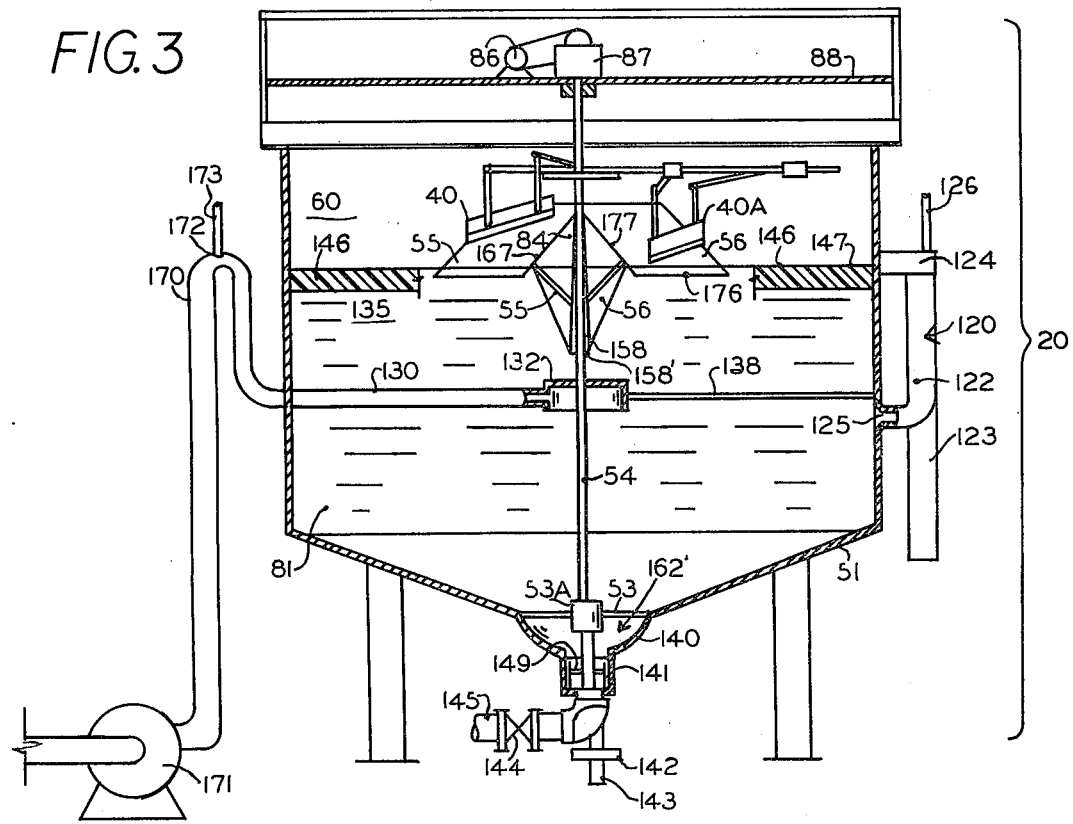
FIG. 3 is a diagrammatic transverse vertical cross-sectional view through the section 3A-3B of FIG. 1.

Entry ramp plate 65 and a discharge ramp plate 66 are firmly attached to and extend over the top edge of the entry plate 55 and the discharge plate 56, respectively. The entry ramp plate 65 extends from a point counterclockwise thereof, as seen from above, as in FIG. 2, over the upper edge (as seen in FIG. 2) of the vertical entry partition plate 55. The discharge ramp plate 66 extends counterclockwise (as seen in FIGS. 4 and 5) and over the vertical discharge plate 56 and slightly forward thereof. The vertically extended discharge partition plate 56 is flat and rigid and sloped upwards and forwards or in a clockwise direction while the entry partition plate 55 is sloped upward and counterclockwise (or downward and clockwise) as shown in FIG. 3. The bottom edges of plates 55 and 56 are, respectively, joined to the counterclockwise (or front) and clockwise (or rear) edges of triangular bottom plate 158; the base 158' of plate 158 is attached in water-tight manner to tank wall 50 below outlet 159.

Another embodiment of entry ramp plate 189 as shown in FIG. 6, may be used in apparatus 20. Ramp plate 189 is formed of a first lower steeply sloped portion 150 and a second upper, less steeply sloped portion 151 joined at a line 152. The line 152 is met and matched by the bottom edge of each blade as 40. The upper portion 151 has a 9½ inch long inner edge 153. Rear edge 154, at its junction with side edge 155 of upper portion 151, is 11¾ inches below top edge 22T of tank 22, and line and edge 152 (which is 48 inches long), at its junction with side edge 155, is 12¼ inches below the top edge 22T of tank 22, while front edge 187 of portion 150 is 31 inches below tank top edge 22T at its junction with 31 inch long side edge 156 of portion 150. Inner edge 188 of portion 150 is 20 inches long and parallel to outer or side edge 156. The adjustability of the length of blade carrier arms 32 and 33 provides for matching the bottom of edge of scraper blade 40 to such differently sloped portions of the ramp while still forming an effective tallow carrying structure. Ramp plate portion 151, like plate 65, similarly extends over the top of plate 55.

In operation, the motor 86 (a 1 horsepower electric motor) drives the speed reducer gear box 87 which, in turn, drives shaft 54 at about 1 revolution per minute, thereupon, the blade carrier assembly 24, being firmly attached to the blade carrier plate 25, rotates with the shaft 54, to which plate 25 is firmly attached. Spider 53 locates a bearing support 53A for shaft 54 in tank 22.

Each of the blade carrier arms, as 32 and 33, pivots about its shaft as 31 (and arms 32A and 32B on shaft 31 and arms 32B and 33B on shaft 31B and arms (not shown) on shaft 31C). As each subassembly 26, 27, 28 and 29 rotates about axis of shaft 54 the cross bars as 72 (and 73) on each sleeve as 34 engages the set screw as 48 on adjacent collars as 44 and 46 and like screws are engaged on other collars (45 and 47) by like screws (49). Thereby, when the blade as 40 is not supported by ramp plate 65 or grate 57 or ramp plate 66, the collars 44, 45, 46 and 47 are fixed relative to the cross bars as 72 on each sleeve as 34 so that the bottom of each blade as 40 is located with its bottom edge above the level of the front or counterclockwise and bottom edge 166 of the grease box entry ramp plate 65. Accordingly, in operation, each blade as 40 rises as it moves clockwise or forward of the ramp as 65, as shown in FIG. 5, while the viscous tallow material pushed before the blade flows downwardly and centrifugally along the lower edge of the blade at its meeting with the ramp surface along a straight but downwardly skewed or oblique line of contact. This flow is blocked by engagement of the side edge of each blade with the wall of tank 22, which side edge is held in such position by springs as 61.

The apparatus 20 provides that the blades 40, 40A, 40B, 40C may be operated at any desired depth in the liquid. The blade bottom edge, in a position shown in FIG. 5 is operated to rotate about shaft 54 in a plane which is located 9 to 12 inches below top or clockwise edge 165 of the ramp entry plate so that the bottom edge of the blade is located at a horizontal plane above the bottom edge 166 of the ramp plate. The blade bottom usually is operated to skim off a layer composed primarily of the tallow layer and free of the tallow and water mixture. Demonstrative of this action is the fact that the tallow recovered in the operation of treating water with 1 to 5% tallow provides, in chamber 81, a composition that is 98%+ tallow while the water taken out through discharge arm 123 (from orifice 125) is less than 1.4 parts per million of tallow.

Apparatus 20, by cooperation of ramp 66 and carrier assembly 24, provides that, on rotation of assembly 24, the return of the bottom edge of each blade as 40, at the edge of the discharge ramp 66, to a level in the to-be-treated liquid whereat the blade again contacts the upper layer of the tallow and entry thereinto is effected smoothly and without entering or agitating the zone 135 between the layer of pure tallow and the zone therebelow whereat the separation between the small particles of tallow and water is initiated.

The operation of apparatus 20 thus provides a process of treating a mixture of packing house waste comprising water and tallow and solid material such as grain by steps comprising first passing such mixture through pipe 130 and casing 132 into a quiescent zone 135 in the vertically elongated first container or chamber 81 far below the level of action of the or scraper blades 40, 40A, 40B (and 40C, not shown) and there separating the water and tallow and forming an upper layer 146 of tallow with its upper edge 147 above the bottom edge 166 of the vertically extending upwardly and forwardly sloped entry ramp 65. The continued movement of the series of like straight edged scrapers 40 forwardly into contact at their bottom edges with the upper surface of the layer of tallow at a level 147 above the bottom edge 166 of the entry ramp 65 and movement of said pivotally mounted scrapers into contact at their sides with the sides of the tank wall 50 at the straight vertical yet flexible side of said scrapers (because of radial urging of the scrapers by springs as 61) forms V-shaped upwardly open pockets on the ramp. The movement of the thus-formed pockets forwardly and upwardly on said ramp moves increments of the layer of tallow therein above the level 147 of tallow layer 146 and movement of the blade over opening 160 deposits those increments of tallow into chamber 80, which is separated from the chamber 81 of tank 22 container. The edges of the hard slats 58A-F thereafter engage the bottom edge of the scraper blade and remove tallow from said scraper, as does the front edge of plate 66. The action of the set screws as 48 and 49 and collars as 44 and 46 and cross bars as 72 maintain all the scraper blades, as 40, at a predetermined height above the floor of tank 22 and in contact with a predetermined depth of the upper layer of tallow. When the scraper as 40 leaves discharge ramp 66 during this process, the quiescent zone is continually fed by a flow of the mixture of water and tallow and other matter, such as grain or dirt, while purified water is drawn off continually from the outlet siphon inlet orifice 125 which is well below the quiescent zone 135. The purified water is passed to a vertical level (in box 124) as high as the top surface level of the material in tank 22. Box 124 is open to the atmosphere and discharged water flows therefrom to a level below the outlet siphon inlet orifice 125, whereby the level of liquid mixture in chamber 81 is maintained automatically by the outlet siphon assembly 120.

When grain or other particulate material that is not floatable in water is fed to apparatus 20, together with the mixture of tallow and water, it passes to sump 140 and is released therefrom to line 145 on opening valve 144 concurrent with the recovery of tallow from chamber 80 and water from outlet siphon inlet orifice 125.

The tallow recovered from the packing house waste by apparatus 20 is used as feed to animals and the grain recovered is also usable as animal feed. The water treated by apparatus 20 is sufficiently pure to pass usual standards for disposal thereof without penalty. The agitator blade 149 at lower end of shaft 54 in sump 140 serves to agitate and render flowable particulate or other matter than settles there and facilitates its subsequent removal.

While the apparatus 20 is described for use in treating packing house waste composed of tallow which is floatable and grain which sinks, the apparatus 20 may also be used for similarly treating mixtures of crude oil and water, such as found in oil field liquors and the apparatus 20 may also be used for treating cannery products such as floatable greens and non-floating components such as sand. In such processes, the oil field liquor, composed of a mixture of crude oil and water, is fed into inlet pipe 130 of apparatus 20 and the floatable materials of the mixture are automatically skimmed off the top of the liquid mass in chamber 81 by blades as 40, 40A, 40B and 40C into chamber 80. Cannery products are similarly fed to pipe 130 and floatable fractions thereof recovered at chamber 80 while sand automatically travels to and is removed at sump 140.

In such processes, also, the vertically elongated tank 22 is used as a container for separating the light semi-liquid components (as oil, greens or tallow) from large volumes of water contaminated therewith and provided at varied input rates to such container. Such volumes of such mixtures are passed into the container 22 at a substantial distance below the zone as 135 whereat its components are initially separated so as to create a deep quiescent zone for such initial separation; a sloped and vertically elongated ramp as 65 or 189 is used to insulate the mass of initially separating material from the translating and agitating action of the series of scrapers as 40, 40A, 40B and 40C. The scrapers are arranged as above described, to act only on the upper surface portions of the mass in the container and to limited depths, while each scraper is also so supported as to provide, at its bottom edge, an upwardly, forwardly and centrally directed straight skewed or oblique line of contact with the sloped ramp upper surface extending from a rearward lower radial point to a forward elevated point on that ramp upper surface, as shown in FIG. 3: while forming a line of contact with the wall of the container adjacent the ramp at the side edge of the scraper whereby to repeatedly create V-shaped pockets with cleanable straight line edges. The pockets so formed serve to continually raise portions of the surface layers of the oily, semi-liquid tallow material or crude oil liquor or cannery greens on the ramp and so separate that floatable component from the liquid mixture initially containing such components. Such action is especially effective because the scraping elements are continually automatically cleansed of usually adherent gum-like oily material contaminating the water by continual passage of such scraper into engagement with cleansing elements as slats 58A-58F and hard front edge of plate 66 located in the path of the flexible linear edged scrapers during such separating operations.

I claim:

1. In a process of treating a fluent mixture of packing house waste comprising water, non-floating solids and tallow, the steps comprising
   a. continuously passing a mixture of said solids, water and tallow at a first vertical level into a first quiescent zone extending vertically upwards of said first vertical level and into which no agitating element enters said quiescent zone located in a vertically elongated first cylindrical container and into a second zone extending downward of said first vertical level and into which second zone no agitating element enters and
   b. separating the water and tallow in said first quiescent zone and forming therefrom at the top of said first quiescent zone an upper layer of semi-liquid tallow, said layer of tallow having an upper surface level above the bottom edge of a vertically extending upwardly and forwardly sloped ramp adjacent the peripheral wall of said container;
   c. moving a series of straight edged scrapers forwardly into contact at their bottom edges with the upper portions of said layer of tallow at a level above said bottom edge of said ramp and resiliently yet firmly moving said scrapers into contact at their sides with the wall of said container at the radial side of each scraper while supporting said scraper on the ramp with its bottom edge providing an upwardly, forwardly and centrally directed straight oblique line of contact with the forwardly, upwardly sloped ramp upper surface, said line extending from a rearward lower radial point to a forward elevated central point on said ramp upper surface, and thereby forming V-shaped upwardly open pockets on said ramp and
   d. continually raising portions of the surface layer of tallow by moving said pockets upwardly on said ramp with increments of said layer of tallow therein above the upper surface level of said tallow, and depositing said increments of tallow in a second container separated from said first container; and
   e. continually automatically cleansing the scraping elements, and
   f. returning said scrapers to said first container at a predetermined height above the floor of said first container and in contact with said upper portion of layer of tallow and above said first quiescent zone and above said bottom edge of said ramp while
   g. drawing off solids from said mixture at the bottom of said second zone and drawing off from said container water from which tallow has been removed at a level below said first quiescent zone and above said second zone.

2. Process as in claim 1 wherein the quiescent zone is continually fed by a flow of said mixture of water and tallow and water is drawn off continually from a discharge zone below said first quiescent zone and passed to a vertical level as high as the level of said mixture in said container and open to the atmosphere and said water flows therefrom to a level below the said discharge zone, whereby the level of liquid mixture in said container is maintained automatically.

3. Process as in claim 2 wherein said mixture includes non-floating particulate grain and said grain passes to and is recovered from the bottom of said first container.

4. Process as in claim 2 wherein the vertical distance from said first level to said bottom of said second zone is greater than the height of said first vertically extending quiescent zone.

5. Process as in claim 4 wherein the tallow content of the water is reduced to 1.4 parts per million.

6. In a process of treating a fluent mixture comprising water, non-floating solids, and floatable semi-liquid gum-like oily material, the steps comprising
   a. continuously passing a mixture of said solids, water and floatable material at a first vertical level into
   (i) a first quiescent zone extending vertically upwards of said first vertical level and into which no agitating element enters, said quiescent zone located in a vertically elongated first cylindrical container and into (ii) a second zone extending downward of said first vertical level and into which second zone no agitating element enters and
   b. separating the water and said floatable material in said first quiescent zone and forming therefrom at the top of said first quiescent zone an upper layer of said floatable material, said layer of said floatable material having an upper surface level above the bottom edge of a vertically extending upwardly and forwardly sloped ramp adjacent the peripheral wall of said container;
   c. moving a series of straight edged scrapers forwardly into contact at their bottom edges with the upper portions of said layer of said floatable material at a level above said bottom edge of said ramp and resiliently yet firmly moving said scrapers into contact at their sides with the wall of said container at the radial side of each scraper while supporting said scraper on the ramp with its bottom edge providing an upwardly, forwardly and centrally directed straight oblique line of contact with the forwardly, upwardly sloped ramp upper surface, said line extending from a rearward lower radial point to a forward elevated central point on said ramp upper surface, and thereby forming V-shaped upwardly open pockets on said ramp and
   d. continually raising portions of the surface layer of said floatable material by moving said pockets upwardly on said ramp with increments of said layer of floatable material therein above the upper surface level of said floatable material, and depositing said increments of said floatable material in a second container separated from said first container; and
   e. continually automatically cleansing the scraping elements, and
   f. returning said scrapers to said first container at a predetermined height above the floor of said first container and in contact with said upper portion of layer of said floatable material and above said first quiescent zone and above said bottom edge of said ramp while
   g. drawing off solids from said mixture at the bottom of said second zone and drawing off from said container water from which said floatable material and solids have been removed at a level below said firs quiescent zone and above said second zone and h. wherein said vertical distance from said first level to said bottom of said second zone is greater than the height of said first vertically extending quiescent zone.

* * * * *